No. 630,002. Patented Aug. 1, 1899.
J. H. NETHERCOTT & J. W. HERSCH.
AIR BRAKE SIGNAL.
(Application filed Feb. 14, 1899.)
(No Model.)
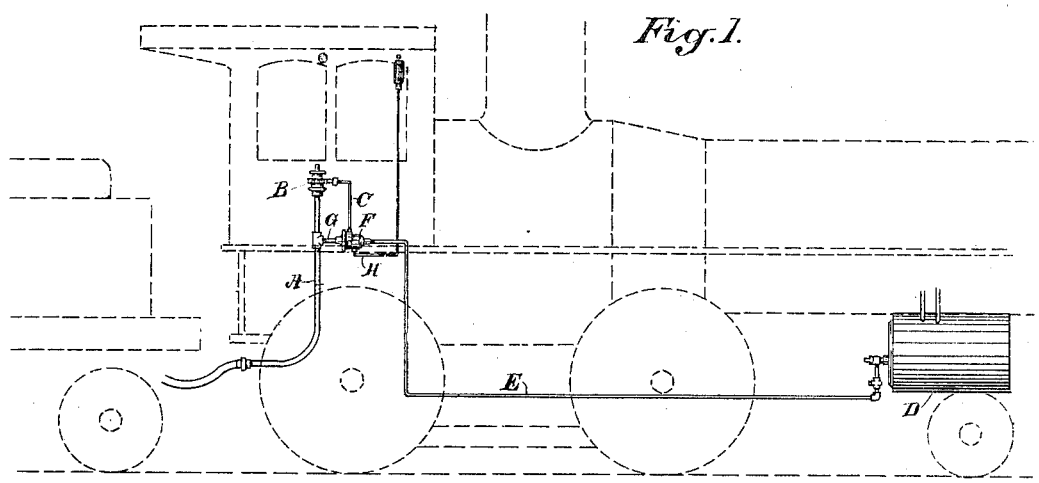
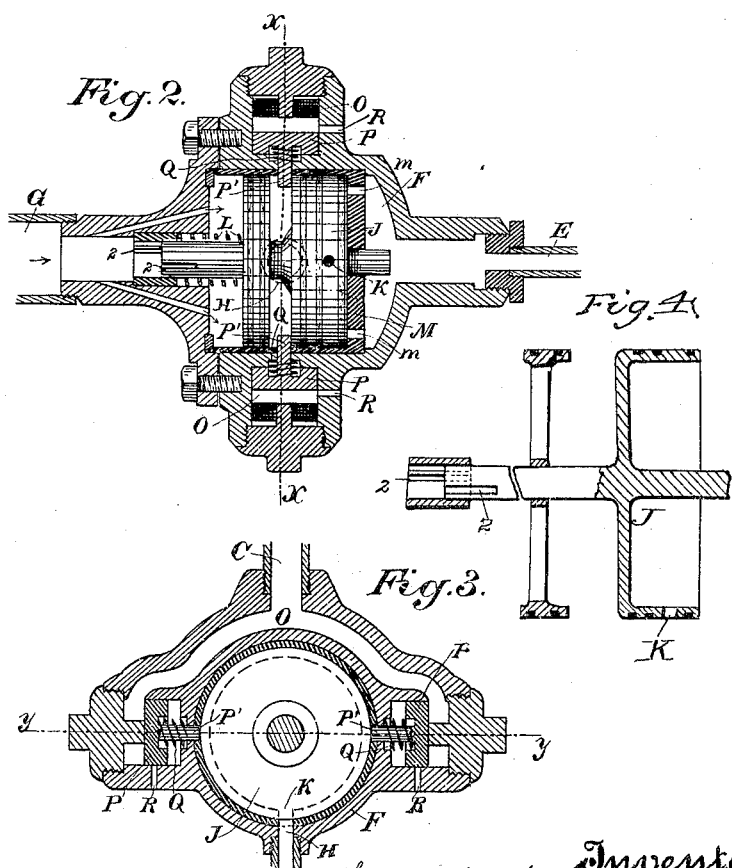

UNITED STATES PATENT OFFICE.

JOSEPH H. NETHERCOTT AND JOHN W. HERSCH, OF ALAMEDA, CALIFORNIA.

AIR-BRAKE SIGNAL.

SPECIFICATION forming part of Letters Patent No. 630,002, dated August 1, 1899.

Application filed February 14, 1899. Serial No. 705,493. (No model.)

*To all whom it may concern:*

Be it known that we, JOSEPH H. NETHERCOTT and JOHN WILLIAM HERSCH, citizens of the United States, residing at Alameda, county of Alameda, State of California, have invented an Improvement in Air-Brake-Signal Reducing-Valves; and we hereby declare the following to be a full, clear, and exact description of the same.

Our invention relates to improvements in air-brake devices.

It consists, essentially, of a chamber containing a whistle or signal controlling valve and interposed between the engineer's valve and the main auxiliary reservoir, with which one end of the chamber is connected, a connection between the other end and the train-brake pipe whereby a reduction of pressure in the brake-pipe from any point in the train will operate the valve and actuate the signal without the use of a supplemental signal-pipe. In conjunction with this is a lock or stop device actuated by the discharge from the engineer's valve, whereby the signal-actuating valve is prevented from moving and the signal from being operated.

It also comprises details of construction, which will be more fully explained by reference to the accompanying drawings, in which—

Figure 1 is a general view showing the connection of the various parts of our apparatus. Fig. 2 is a sectional view of the signal-actuating mechanism on line $y\,y$ of Fig. 3. Fig. 3 is a similar view on line $x\,x$ of Fig. 2. Fig. 4 is a longitudinal section through the valve J, showing the port K.

As shown in the drawings, A is the train-brake pipe, B the engineer's valve, and C a pipe through which the waste air is discharged from the engineer's valve.

D is the main reservoir, from which a pipe E, with suitable reducing-valve, connects with one end of the valve-chamber F. The opposite end of this chamber is connected by a pipe G with the train-brake pipe A.

From the side of the chamber F a pipe H leads to the whistle or signal. This pipe and passage are controlled by a piston or other suitable valve J. As here shown, the chamber F is cylindrical, and the valve J is a plunger fitting and movable within the cylinder. Through the side of the piston is an opening K, leading to the interior of the piston, and when air under pressure is admitted into the interior of the piston its tendency is to pass out through the opening K. This is prevented whenever the piston is in its normal position within its casing or cylinder; but when it is moved so as to bring the opening K to coincide with the passage H air can escape and the signal will be sounded. The opening or port K is kept in line with the passage H by feathers 2 or other means at the opposite end of the shaft or spindle, which prevents the latter from turning.

The reducing-valve (which is essentially the same as used in the automatic brake in connection with the signal in common use) prevents a rapid filling of the pipe E in case air is withdrawn from it and reduces the air-pressure in the pipe E to about what the pressure is in the train-pipe. As the air which sounds the whistle is derived from the pipe E, it will be seen that by reason of the reducing-valve the pressure in this pipe E is temporarily reduced, so that the pressure in the train-pipe, in conjunction with the spring L, will be sufficient to return the piston to its normal position.

By reason of the pressure-reducing valve the pressure in the pipe E will be overcome by the pressure of the spring L and the air-pressure admitted to the opposite end of the cylinder from the train-brake pipe through the pipe G, and this latter pressure, in conjunction with the spring L, will normally hold the piston-valve J in the position shown seated against the disk M and with the holes K and H out of line with each other.

If the conductor or any of the train-hands desires to signal the engineer, he makes a reduction of the air-pressure in the train-brake pipe by any of the usual means connected with the various cars in the train. As soon as this reduction takes place, a corresponding reduction is made in the end of the cylinder F which connects with the train-brake pipe through the pipe G. This reduction makes the pressure upon that end of the piston J less than it is upon the opposite end through the pipe E. The result will be that air passing through the holes m in the disk M will act upon the piston J and force it forward against the tension of the spring L until the openings K and H are brought into line. Air then passes through these openings and to the whistle or signal, thus calling the engineer's attention to the signal. As soon as the conductor stops signaling the pressure in the train-pipe, plus that of the spring L, will move the piston J back to its normal position, because these pressures are momentarily greater than that in the pipe E owing to the fact that air to sound the whistle has been taken from the pipe E, and the pressure-reducing valve retards the filling of this pipe to its normal pressure for a sufficient time to allow the piston to be returned. The signals given by the conductor consist of rapid sharp movements, which only momentarily reduce the air-pressure in the train-pipe by a sort of vibration; but this is sufficient to allow the pressure in the pipe E to overcome the tension of the spring L sufficiently to sound the signal; but the escape of air from the pipe E in sounding the signal will instantly reduce the pressure in this pipe long enough for the train-pipe pressure and spring L to again return the piston to its normal position, as the reducing-valve connecting with the pipe E prevents the pressure in the pipe E reaching its normal just long enough to allow these movements.

The waste air or discharge from the engineer's valve passing through the pipe C enters a chamber or chambers O, which lie upon opposite sides of the cylinder, and contain plungers which are movable radially with reference to the plunger J. These plungers P have stems P', which may be projected into the path of the cylinder J, and thus prevent its being moved. These plungers P are normally held out in their chambers, so that the stems P' are out of line of the plunger J, by springs Q. The chambers O may be preferably connected with a common air-inlet passage or pipe C by a channel which may be cast around the periphery of the cylinder, so that when the air is admitted it will act equally upon both the plungers P. When therefore the air escapes through the passage C and acts upon the pistons P, they will be immediately forced inwardly and the stems P' will pass into the cylinder F in the line of travel of the piston-valve J, and will thus prevent its being moved by the decrease of pressure in the train-pipe by the action of the engineer in applying the brakes and which would otherwise act to sound the whistle or signal. Being thus prevented from moving, the openings K and H cannot be brought into line, and the operation of the engineer's valve will not cause any sound of the signal. As soon as the engineer's valve is returned to its normal position the air within the chambers O will escape through the small escape-passages R, and when the pressure behind the pistons P is sufficiently reduced the springs Q will act to force the pistons outwardly, retracting the stems P', so that the parts are again in condition for operation whenever pressure in the train-brake pipe is reduced.

The holes R, through which the air is allowed to escape, are so much smaller than the passages which lead from the engineer's valve to the chambers O that there will always be sufficient pressure to force the pistons P inwardly against the tension of the springs Q as long as the engineer's valve is being operated; but as soon as it is returned to its normal position and the escape of air from it ceases the air within the chambers O will in a moment or two have escaped through the passages R sufficiently to allow the springs to return the passages P and the stems P' to their normal condition.

Having thus described our invention, what we claim as new, and desire to secure by Letters Patent, is—

1. In combination with an air-brake mechanism and the single train-brake pipe thereof, and an air-operated signal, a chamber one end of which connects with the train-pipe while the opposite end connects with the main reservoir, said chamber having a passage connecting its interior with the signal, a hollow piston-valve movable in said cylinder, and a spring acting upon the side of the piston toward the train-pipe and normally retaining the piston at the opposite end of the cylinder said piston having a port to be alined with the passage leading to the signal when the pressure against one side of the piston overcomes the air-pressure and pressure of the spring at the opposite side.

2. The combination with an air-brake mechanism and the single train-brake pipe thereof, and an air-operated signal, of a cylinder connecting with the signal and connecting at opposite ends with the train-brake pipe and main reservoir, a spring-actuated piston movable in said chamber and normally retained at one end thereof, said piston being hollow and having a passage through one side to be alined with the passage leading to the signal when the pressure on one side of the piston overcomes the combned air-pressure and spring-pressure at the opposite side, whereby a reduction of pressure in the train-brake pipe sounds the signal in the engineer's cab.

3. The combination of an air-brake mechanism, the single train-brake pipe thereof, an air-operated signal, a chamber interposed between the train-pipe and the main reservoir and having a passage leading from its interior to the signal, and a hollow piston-valve in said chamber having a port or passage through one side adapted to be alined with the passage to the signal by the reduction of pressure in the train-pipe whereby the signal is sounded.

4. The combination with an air-brake mechanism and the train-brake pipe thereof, of a cylinder having a hollow piston-valve movable therein, a spring whereby said valve is normally retained at one end of the cylinder, a passage from the interior of the cylinder leading to the whistle or signal, the similar passage in the wall of the piston-valve normally out of line with the signal-passage, connection between the opposite ends of the cylinder with the train-brake pipe and the air-signal reducing-valve respectively whereby the pressure in the opposite ends of the cylinder may be varied and the valve actuated.

5. An air-brake signaling device consisting of a cylinder, a hollow piston movable therein, a spring by which the piston is normally retained at one end of a cylinder, connection between that end of the cylinder and the signal reducing-valve of the main reservoir, connection between the opposite end of the cylinder and the train-brake pipe whereby a reduction of pressure in the train-brake pipe causes the air-pressure from the opposite end to force the piston forward, passages in the side of the cylinder connecting the interior of the cylinder with the whistle or signal, a corresponding passage made transversely through a wall of the piston and which is brought into line with the signal-passage by the movement of the piston, whereby the signal is sounded.

6. In an air-brake signal, the cylinder having a piston movable therein, and a spring by which the piston is normally retained at one end of the cylinder, connection between that end of the cylinder and the signal reducing-valve, connection between the opposite end of the cylinder and the train-brake pipe, passages in the cylinder and in the piston which are caused to coincide and supply air and sound the signal by a reduction of pressure in the train-brake pipe, radially-disposed chambers having plungers movable therein and stems adapted to be projected into the path of the piston in the main cylinder, air connections whereby said radial plungers are moved to prevent a movement of the main piston and the sounding of a signal.

7. In an air-brake signal reducing device, a cylinder containing a reciprocating valve, movable by variation of air-pressure and controlling the air-passage by which a signal is sounded, cylinders radial to the main cylinder having plungers movable therein and stems adapted to be moved into the path of the main cylinder to prevent its valve moving to open the air-signal connection, passages connecting with the discharge from the engineer's valve whereby said discharge air is admitted behind the radially-disposed plungers, springs by which said plungers are returned to their normal position when relieved of air-pressure, and passages for the escape of air.

In witness whereof we have hereunto set our hands.

JOSEPH H. NETHERCOTT.
JOHN W. HERSCH.

Witnesses:
  GEO. H. STRONG,
  S. H. NOURSE.